Jan. 12, 1937.  P. KOLLSMAN  2,067,767
HYDROSTATIC GAUGE
Filed July 1, 1932
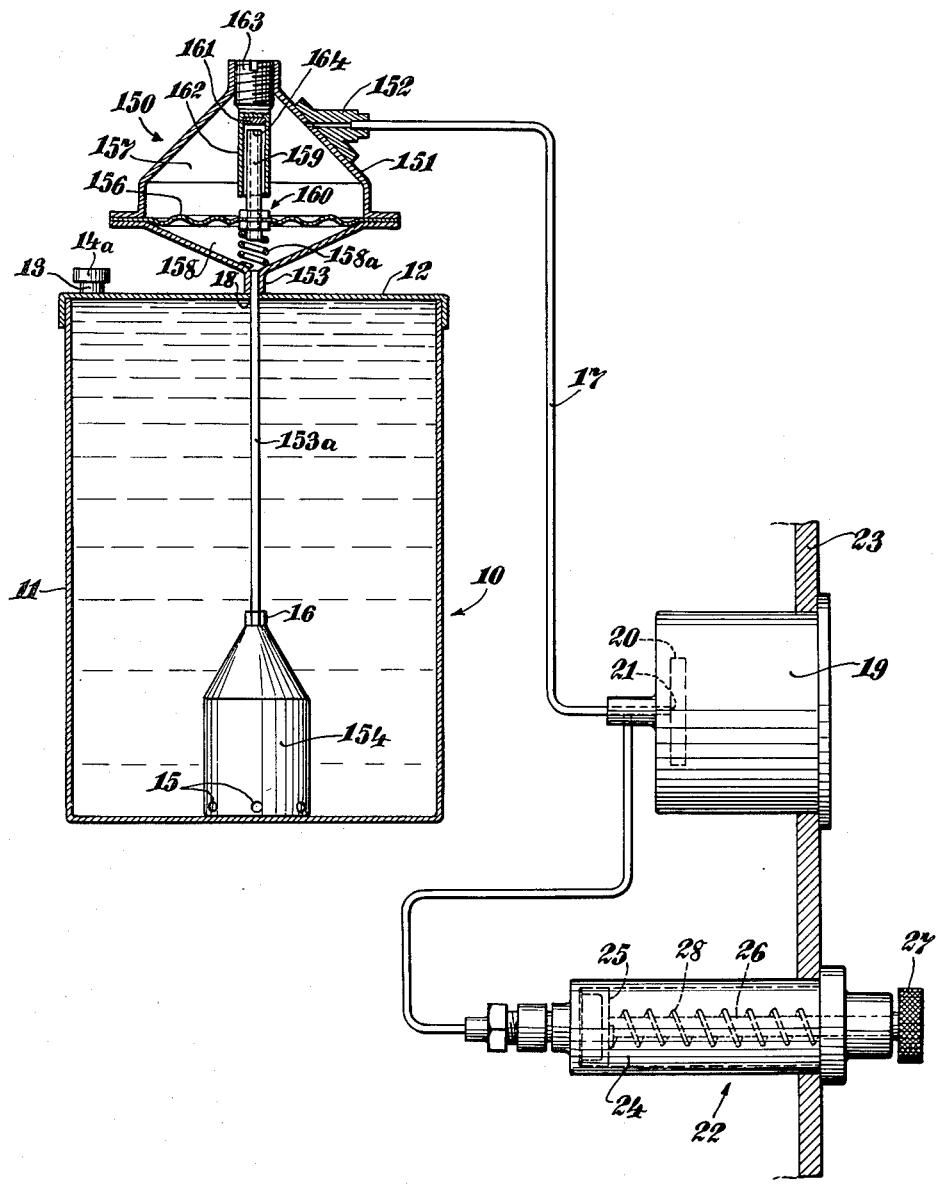
INVENTOR.
Paul Kollsman
BY
Chris Shumacher
ATTORNEY.

Patented Jan. 12, 1937

2,067,767

UNITED STATES PATENT OFFICE 2,067,767

HYDROSTATIC GAUGE

Paul Kollsman, Woodhaven, N. Y.

Application July 1, 1932, Serial No. 620,397

1 Claim. (Cl. 73—54)

This invention relates to hydrostatic gauges and has particular reference to devices of this character having a long air pressure conduit of relatively fine bore communicating with a liquid whose level is to be measured and also with a pressure sensitive indicator and an air replenishing injector.

One application for which the invention is especially adapted is for measuring the level of the liquid fuel on the tank of an airplane. While the indicator is mounted on the instrument dash board, the fuel tank may be positioned at some remote point of the airplane body, or in the wings thereof and may thus be considerably above the level of the indicator. The pressure conduit may include an air receiver located in the lower part of the fuel tank and communicating therewith, but the conduit is of very small inside diameter so that its volume is comparatively small as against the air receiver volume, whereby the effects of expansion and contraction of air due to temperature and atmospheric pressure changes are maintained at a minimum and tend to be localized in the air pressure receiver. Another advantage of using a pressure conduit of small bore is that the manually operated air injecting means, which is used to replenish air dissipated from the system by leakage, may be of small size and can be mounted directly on the instrument dash board, and may inject all the necessary air with one or two reciprocations of the piston thereof.

Because of the very small bore of the pressure conduit, if any liquid fuel should enter and flow along a section of the conduit, it may remain there and prevent the gauge from operating, or drops of the liquid fuel may collect at different points in the conduit and cause an erroneous indication by the gauge. I have found that liquid may enter the pressure conduit under various circumstances. An important reason is that when the aircraft descends from a high elevation, the air supply, which may have been depleted by leakage, may further diminish in volume due to increasing atmospheric pressure, so that the liquid may enter a portion of the pressure conduit. Then again, when the fuel tank is filled, the air pressure, which may be low or may have been dissipated, may permit the liquid to flow up into the conduit, especially if the tank is filled up into the inlet connection. At other times, sudden jarring or accelerating forces may cause a projection of liquid into the conduit. A particular cause obtains when an aircraft makes a substantial angle with the horizontal, from its normal upright position. Now when the air injecting pump is used, the cup leather type piston is first retracted and may create a suction on the conduit and draw the projected liquid further thereinto. On the forward stroke of the piston, a part of the liquid may be driven back into the fuel tank, but sufficient may remain on the wetted walls of the conduit to flow together and form drops which will interfere with the correct operation of the gauge. If the conduit extends downward, liquid may collect in the pockets so formed, and should there be considerable liquid in the conduit, the flow of air pressure may be prevented so that the full force of the pump may act upon the pressure sensitive means and cause undue strain thereon.

It has therefore been an object of this invention to ascertain the cause of the defects mentioned and to provide a practical, simple means for remedying the same.

Other objects of the invention are the provision of a device of the nature set forth having improved means for reliably closing the air pressure conduit upon an undue flow of liquid therein so as to prevent further flow of the liquid, and to prevent a drawing in of liquid upon retraction of the pump piston without requiring a suction cut off valve at the pump; and to provide an improved means of this character which may be opened upon exertion of a sufficient pressure thereon so as to avoid damage to the pressure sensitive means; and to provide improved closure means as set forth located preferably adjacent to or above the maximum level of liquid in the fuel tank so that the conduit will remain open until an excessive elevation of liquid in the conduit is obtained.

Another object of the invention is to provide a device of the type mentioned which has few and simple parts, which can be readily assembled and taken apart, and which is inexpensive to manufacture, reliable and efficient in use.

Other objects and advantages of the invention will become apparent as the specification proceeds.

In the drawing is shown a view partly in elevation and partly in vertical section of a device embodying the invention.

It will be noted that while air pressure, liquid fuel, and liquid fuel tanks are referred to herein, that these terms may signify any fluid pressure, and any liquid, and any kind of liquid receptacle, the device being adapted to be used for different purposes.

Referring in detail to the drawing, 10 denotes a device embodying the invention. The same may include a conventional liquid tank 11 having a cover 12 that may be permanently or removably secured thereto, said cover having a filling neck or connection 13 provided with a suitable closure or headed projection 14a. Said tank may be filled with liquid to any desired level, and adjacent to the bottom of said tank is any air pressure receiving compartment 154, that may have one or more openings 15 whereby the air therein is subject to the head of the liquid in the tank. Connected to the air receiving compartment, preferably at an upper end thereof, as at 16, is a pressure conveying conduit 153a extending upward in the tank 11 and through the top wall thereof at 18, and thence downward into communication with any suitable pressure sensitive indicator 19. The latter may have an elastic pressure responsive box 20 with which the conduit 17 communicates as at 21. Also connected to the pressure conduit 17 is an air replenishing or injecting means or reciprocatory pump 22 of any desired nature. It will be noted that the pressure conduit 17 may be of considerable length, and that the pressure sensitive indicator or pressure injecting means 22, or both, may be positioned remotely from the liquid tank 11. In the case of aircraft, for instance, a fuel tank 11 may be located at a distant point in the body of the airplane, while the devices 19 and 22 may be mounted on the instrument dash board 23.

The pressure injecting means 22 may include a pump having a cylinder 24 and a cup leather piston 25 therein mounted on an actuator rod 26 and adapted to partially yield or contract during retraction. The rod 26 may have a finger piece or head 27 whereby the piston is retracted, the piston being then projected under the force of an expansion coil spring 28.

The invention includes a control device 150 responsive to a rise in elevation of a liquid to close a valve for the air pressure conduit, and to be responsive to an increase of air pressure in said conduit to cause said valve to open. The device may be so arranged as to operate even in an inverted position. If the device be constructed to utilize the buoyancy of a liquid, said liquid may rise considerably so as to add a pressure head for causing the actuation. Likewise the valve per se may be denominated a liquid seal with the liquid retained in a required position as a valve seal in any angular position of the device relative to a horizontal plane.

Specifically, the device 150 may include any casing 151 which may be fluid tight, except for spaced connections 152 and 153, the former of which may be above the latter. The connection 153 may communicate by means of the tube 153a of small or other suitable bore with the air receiver 154. The connection at 152 may communicate with the conduit 17. Between the connections 152, 153, a fluid responsive means such as a plunger or diaphragm 156 may be disposed to divide the casing 151 into compartments 157, 158. By using a diaphragm, the friction of relatively moving elements is avoided. The diaphragm may consist of thin metal, leather, artificial leather or other composition material. Preferably a pliable porous or fibrous material is employed so as to be highly sensitive, and this material may be impregnated so as to resist the action of the fluid and to maintain the life of the diaphragm. Preferably the diaphragm may be impregnated with glycerine, castor oil, or the like, which is nonmiscible with gasoline and is of a viscous nature, thus serving also to close the pores in the diaphragm. The latter may be substantially flat or provided with concentric corrugations. Actuated by the diaphragm is a valve element 159 which may be secured thereto at 160 so as to be carried thereby, in the chamber 157. A companion valve element 161 may be mounted in the casing chamber 157 so as to be engaged by element 159 upon upward movement of the diaphragm 156. For affording a relative guiding coaction between the valve elements, a tube 162 may be affixed at 163 to the casing 151, said tube having a closed upper end against which the valve element 161 is disposed, and the tube extending downward to receive the element 159 with a suitable clearance.

The valve element 161 may afford a liquid seal, and to that end may include a suitable liquid retained in a soft or yielding material so that a closure is effected as by the formation of a film of liquid in contact with element 159. Thus the valve element 161 may be made of a soft leather, felt or other porous or fibrous material, thoroughly impregnated with an oil, such as castor oil, glycerine, or other preferably somewhat viscous liquid which will not disintegrate and which is slow to evaporate.

If the diaphragm consist of leather or the like, a supporting light spring 158a may be used, which, however, may be unnecessary with a metallic diaphragm.

A suitable communication is afforded between chambers 157 and 158, so that air may be caused to flow from the former into the latter and hence into the tube 153a, and also into air receiver 154 if the same be used. If the liquid level should accidentally rise in the fine bore resistance tube 153a the capacity chamber 158 may be filled therewith. In order that considerable force of the liquid be available for moving the diaphragm, the point of communication between chambers 157, 158 is arranged in any suitable manner so as to be substantially above the diaphragm and preferably at least at the level of valve element 161. A simplified manner of effecting this result is to make the valve element 159 of tubular form so as to communicate at its opposite ends with chambers 157, 158 respectively. Hence the smooth annular edge of the upper end 164 of the tube 159 affords the valve seating engagement with the element 161. By this construction, no liquid can flow into chamber 157, until the liquid has attained the level of the upper end 164 of valve element 159, assuring a safe margin for effective operation of the valve, particularly as the diaphragm is made to move upward upon the slightest pressure or buoyant force of liquid on the diaphragm. As a result of the lightness in weight of the diaphragm, as supported by the spring 158a, the latter will readily move the diaphragm to close the valve when the gauge is tilted, because the weight of the diaphragm will, in tilted position, be assumed in larger degree by the casing, so that it will exert less force to counteract the spring. Where the liquid rises to the end 164, it will contact the valve element 161 and the latter, if dry and porous, will absorb some of said liquid and afford a soft, yielding liquid seal, even where the valve element 161 may not have been initially impregnated. Hence a liquid absorbent seal may also be used. It will be noted that by this device only a small limited force may be exerted on the valve element 161, so as to prevent cutting, distortion, or substantial expression of the liquid thereof, and the surface tension of a liquid is relied upon to form a perfect seal in conjunction with actual contact of the valve elements.

In operation, if the device be inverted or turned through a substantial angle, the liquid will also move the diaphragm to close the valve. The chamber 158 affords a trap above the tank 11 to prevent liquid from accidentally entering the conduit 17. The liquid in chamber 158 and in tube 153a may be driven out by operating pump 22, the air pressure entering the air capacity chamber 157 to act on the entire diaphragm area to move the same and cause the valve to open so as to permit air to flow through valve element 159 into chamber 158, tube 153a and air receiver 154. It will be perceived that this device affords a closed system that may be used equally well with Pitot tubes and hydrostatic gauges for all purposes.

It will be appreciated that various changes and modifications may be made in the device as shown in the drawing, and that the same is submitted in an illustrative and not in a limiting sense, the scope of the invention being defined in the following claim.

I claim:

An aircraft hydrostatic gauge system including air pressure conveying means of relatively fine bore in open communication at a lower end with a liquid whose head is to be measured, a pressure sensitive means connected to the pressure conveying means, means for injecting air into the pressure conveying means, and means for closing the pressure conveying means to prevent a portion of said liquid from flowing therethrough, the closing means including a valve means, a diaphragm below the same for opening and closing the valve means upon respective downward and upward movement of the diaphragm, and a casing for the valve means and diaphragm divided by the latter into upper and lower compartments that are in communication with each other, the diaphragm being of sufficient area and having the compartment above the same in communication with the pressure injecting means so as to be adapted to positively open the valve means, and the lower compartment being in communication with the pressure conveying means so that the diaphragm is raised to close the valve means by liquid received in the lower compartment, said valve means controlling the intercommunication between said compartments, the closing means and the pressure conveying means being normally wholly air filled, and resilient means for automatically raising the diaphragm to close the valve means when the gauge system is tilted through an angle by the aircraft, and the indicator being substantially unaffected by the operation of the closing means, said casing being spaced along the pressure conveying means so that said lower compartment is above the liquid and constitutes a trap for liquid in the pressure conveying means adapted to drain liquid in the trap back into the pressure conveying means, and the pressure conveying means affording a resistance to the flow of liquid into said lower compartment.

PAUL KOLLSMAN.